United States Patent [19]
Wright

[11] Patent Number: 4,900,055
[45] Date of Patent: Feb. 13, 1990

[54] HYDRAULIC RETRACTABLE AND EXTENSIBLE WHEEL SUSPENSION

[75] Inventor: Clem B. Wright, South Fulton, Tenn.

[73] Assignee: Waymatic, Inc., Fulton, Ky.

[21] Appl. No.: 329,560

[22] Filed: Mar. 28, 1989

[51] Int. Cl.⁴ .............................................. B60G 25/00
[52] U.S. Cl. .................................. 280/704; 280/6.12; 280/709
[58] Field of Search ............... 280/704, 711, 712, 713, 280/672, 840, 6.1, 6.12, 702, 709; 180/41

[56] References Cited

U.S. PATENT DOCUMENTS

| | | | |
|---|---|---|---|
| 4,171,830 | 10/1979 | Metz | 280/704 |
| 4,504,080 | 3/1985 | Van Denberg | 280/704 |
| 4,842,302 | 6/1989 | Lauronen et al. | 280/704 |

Primary Examiner—Richard A. Bertsch
Attorney, Agent, or Firm—Brady, O'Boyle & Gates

[57] ABSTRACT

A hydraulic retractable and extensible tandem wheel suspension for a food service concession trailer for lowering the trailer to a position adjacent the ground to position the serving area of the trailer at a position convenient to a customer, and for raising the trailer for transportation to a desired location.

6 Claims, 1 Drawing Sheet

HYDRAULIC RETRACTABLE AND EXTENSIBLE WHEEL SUSPENSION

BACKGROUND OF THE INVENTION

Various hydraulic retractable and extensible wheel suspension systems have been provided for vehicles wherein the vehicle may be hydraulically raised to a transporting position or lowered to a ground level position to facilitate loading or unloading the vehicle. While these systems have been satisfactory for their intended purpose, they have been characterized as being complex, having many moving parts and requiring the design and construction of an axle and wheel suspension for use on the particular vehicle.

After considerable research and experimentation, the hydraulic retractable and extensible wheel suspension of the present invention has been devised for use on trailers, particularly concession trailers manufactured for food service, wherein a standard off-the-shelf axle assembly is pivotally connected to the trailer frame at a point offset from the wheel spindle and axle, whereby the floor of the trailer can be brought extremely close to the ground. A hydraulic cylinder is operatively connected to the axle assembly for pivoting the axle assembly about the offset pivot point, to thereby raise and lower the trailer.

DESCRIPTION OF THE PREFERRED EMBODIMENT

Figure 1:
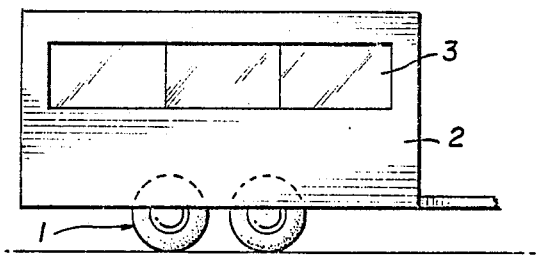
FIG. 1 is a diagrammatic view of a concession trailer in the raised position.
Figure 2:
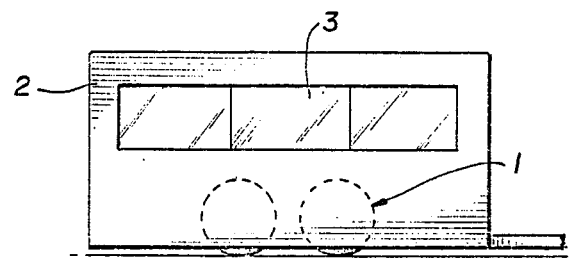
FIG. 2 is a diagrammatic view of a concession trailer in the lowered position.

Referring to the drawings and more particularly to FIGS. 1 and 2, the hydraulic retractable and extensible wheel suspension assembly 1 of the present invention is adapted for use on various vehicles but particularly on a concession trailer 2 having a serving area 3 and wherein it is adapted to be trailed to a desired location as shown in FIG. 1, and then lowered to a position adjacent the ground, as shown in FIG. 2, to thereby position the serving area 3 of the trailer at a position convenient to a customer.

Figure 3:
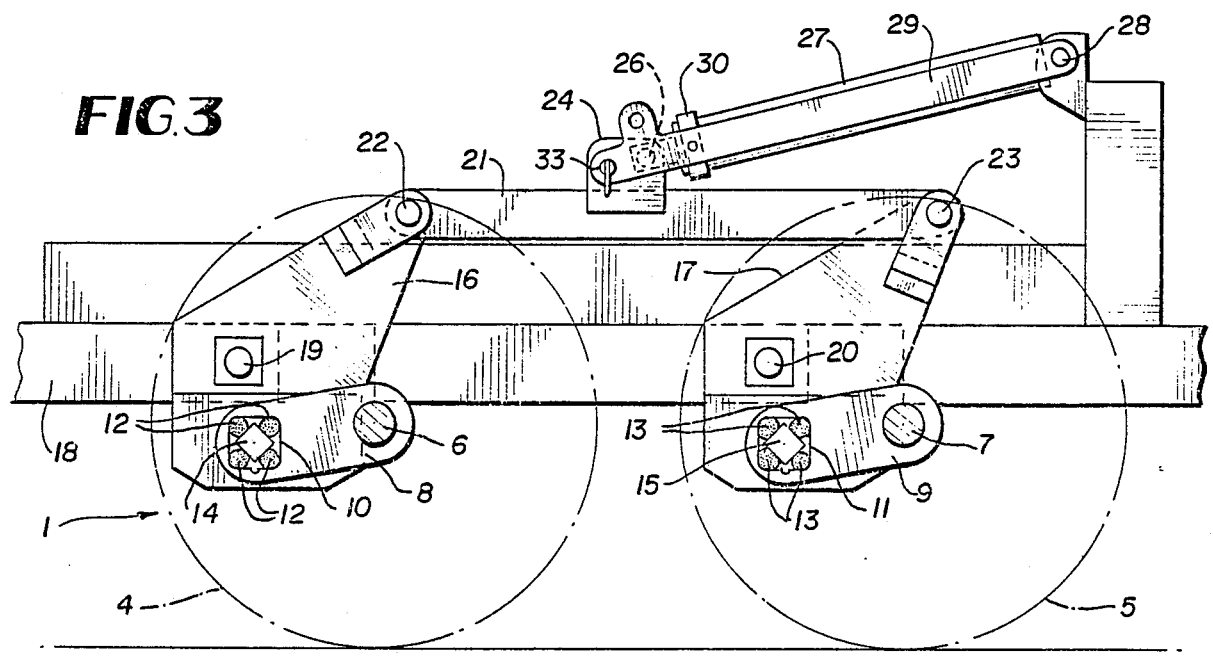
FIG. 3 is a side elevational view of the hydraulic retractable and extensible wheel suspension assembly of the present invention showing the wheels in the lowered or extended position to elevate the trailer.
Figure 4:
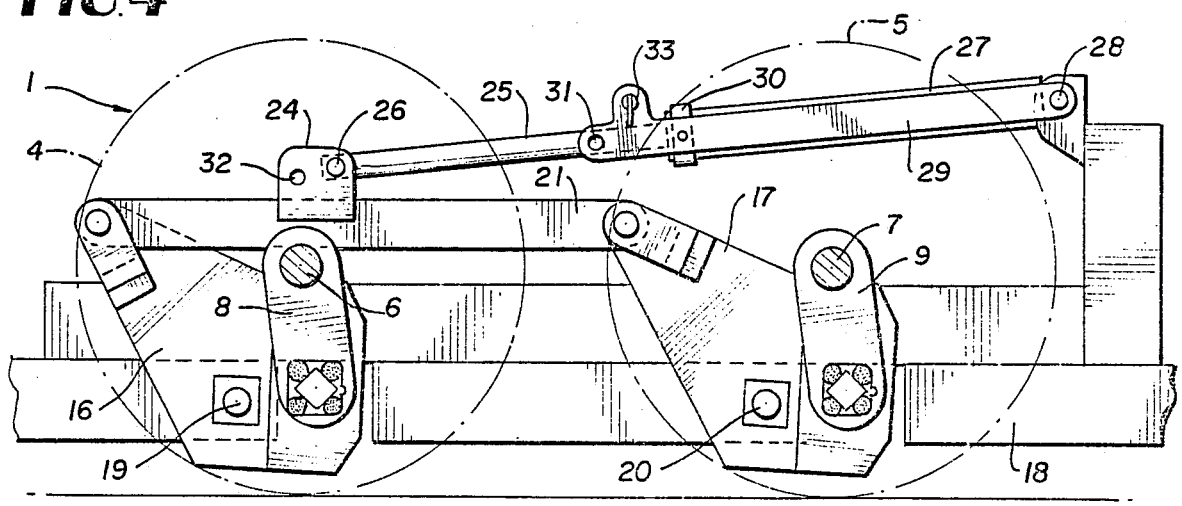
FIG. 4 is a side elevational view of the assembly shown in FIG. 3 wherein the wheels have been retracted or raised to thereby lower the trailer.

The details of the construction of the hydraulic retractable and extensible wheel suspension assembly 1 are illustrated in FIGS. 3 and 4, wherein it will be seen that a pair of tandem wheels 4 and 5 are each rotatably mounted on a respective wheel spindle 6 and 7 connected to one end of a torsion arm 8 and 9, the opposite end of each torsion arm having a rectangular opening 10, 11 for receiving a plurality of rubber lobes or cords 12, 13 positioned between the side walls of the rectangular opening and the corresponding side walls of a tubular axle 14 and 15. It will be understood by those skilled in the art that the axles 14 and 15 extend transversely of the trailer and are connected to a similar tandem wheel arrangement on the opposite side of the trailer. Since the suspension assemblies on each side of the trailer are identical, only one assembly is being described in detail.

Each wheel and associated axle assembly is mounted on a respective lever 16 and 17 pivotally connected to the trailer frame 18 as at 19 and 20, which are offset from the wheel spindle and axle. Each lever has a rectangular opening, not shown, corresponding to and in alignment with the rectangular openings 10, 11 in the torsion levers 8 and 9, the rubber cords 12 and 13 also extending between the corresponding side walls of their respective axle 14 and 15 and the side walls of the rectangular opening in the levers 16 and 17. By this construction and arrangement, the torsion arms 8 and 9 and axles 14 and 15 are connected to the levers 16 and 17.

A link 21 extends between the upper end portions of the levers 16 and 17 and is pivotally connected thereto as at 22 and 23 at a point above and offset from the pivots 19 and 20. A bracket 24 is fixedly secured to the medial portion of the link 21 to which the outer end of a piston rod 25 is pivotally connected as at 26. The piston rod 25 is telescopically received within a hydraulic cylinder 27 pivotally connected to the trailer frame as at 28.

In the operation of the wheel suspension assembly thus far described, when the hydraulic piston rod 25 is in the retracted position, as shown in FIG. 3, the wheels 4 and 5 are in the lowered position, whereby the trailer 2 is in the raised position as shown in FIG. 1. To lower the trailer to the ground position, as shown in FIG. 2, the piston rod 25 is moved to the extended position, as shown in FIG. 4, causing the link 21 to move in a rectilinear direction causing the levers 16 and 17 to pivot simultaneously, about pivots 29 and 20, in a counterclockwise direction, thereby moving the wheel spindles 6 and 7 through an angle of substantially 90°, whereby the wheels 4 and 5 are raised.

To complete the structure of the wheel suspension of the present invention, a safety shackle 29 is mounted at the forward end of the cylinder 27 by an annular shackle stay 30 and at its rear end to the cylinder pivotal connection 28. The foward end of the shackle 29 is provided with an aperture 31 adapted to be aligned with a corresponding aperture 32 provided in the bracket 24. A removable pin 33 is provided for insertion through the aligned apertures 31, 32 to hold the piston rod 25 in the retracted position when the wheels 4 and 5 have been lowered to raise the trailer. The forward end portion of the shackle 29 is provided with a second hole or aperture 34 adapted to receive the removable pin 33 for storage when the piston rod is in the extended position to raise the wheels, as shown in FIG. 4.

It is to be understood that the form of the invention herewith shown and described is to be taken as a preferred example of the same, and that various changes in the shape, size and arrangement of parts may be resorted to, without departing form the spirit of the invention or scope of the subjoined claims.

I claim:

1. A hydraulic retractable and extensible wheel suspension for a trailer for raising the trailer to a transporting position and lowering the trailer to a ground level position comprising, a pair of tandem wheels, a torsion arm for each wheel, each wheel being rotatably mounted on one end of a respective torsion arm, torsion spring means connected to the opposite end of each torion arm, a pair of levers pivotally mounted on the trailer frame, said torsion spring means being connected to each lever, a link extending between said levers and being pivotally connected at each end to a respective lever, and hydraulic cylinder means connected between the trailer frame and the link, whereby upon extension of said hydraulic cylinder means, the pair of levers are caused to pivot simultaneously in a direction to raise the tandem wheels, to thereby lower the trailer to the ground level position, and upon retraction of said hydraulic cylinder means the pair of levers are caused to pivot simultaneously in the opposite direction to lower the tandem wheels, to thereby raise the trailer from the ground level position.

2. A wheel suspension according to claim 1, wherein the torsion spring means comprises, a rectangular aperture provided in the opposite end of each torsion arm, a tubular axle mounted coaxially with respect to said rectangular aperture and being rectangular in cross-section, the side walls of said rectangular aperture being spaced radially outwardly from the walls of said tubular axle, and a pluarlity of rubber lobes mounted within the space between the tubular axle and the side walls of said rectangular aperture.

3. A wheel suspension according to claim 1, wherein the hydraulic cylinder means comprises, a cylinder connected to the frame of the trailer, and a piston rod slidably mounted within said cylinder, the outer end of said piston rod being connected to said link.

4. A wheel suspension according to claim 3, wherein a bracket is fixedly secured to the medial portion of said link, the outer end of said piston rod being pivotally connected to said bracket.

5. A wheel suspension according to claim 4, wherein a safety shackle is mounted on the forward end of said cylinder, the forward end of said shackle having an aperture, an aperture provided in said bracket, said bracket aperture being alignable with the shackle forward end aperture when the piston rod is moved to the retracted position, and a removable pin inserted through the aligned apertures for holding the piston rod in the retracted position.

6. A wheel suspension according to claim 5, wherein another aperture is provided in the forward end of the shackle for receiving the pin in a stored position when the piston rod has been moved to the extended position.

* * * * *